United States Patent
Enevoldsen et al.

(10) Patent No.: US 11,313,346 B2
(45) Date of Patent: Apr. 26, 2022

(54) METHOD OF MANUFACTURING WIND TURBINE ROTOR BLADES

(71) Applicant: Siemens Gamesa Renewable Energy A/S, Brande (DK)

(72) Inventors: Peder Bay Enevoldsen, Vejle (DK); Steffen Frydendal Poulsen, Vejle (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 113 days.

(21) Appl. No.: 16/431,765

(22) Filed: Jun. 5, 2019

(65) Prior Publication Data
US 2019/0376487 A1 Dec. 12, 2019

(30) Foreign Application Priority Data
Jun. 8, 2018 (EP) .................................. 18176812

(51) Int. Cl.
*F03D 1/06* (2006.01)
*F03D 13/10* (2016.01)
*G05B 19/4155* (2006.01)

(52) U.S. Cl.
CPC .......... *F03D 1/0675* (2013.01); *F03D 13/10* (2016.05); *G05B 19/4155* (2013.01); *F05B 2230/21* (2013.01); *F05B 2240/302* (2013.01); *G05B 2219/2619* (2013.01); *G05B 2219/45147* (2013.01)

(58) Field of Classification Search
CPC ........ F03D 1/0675; F03D 1/065; F03D 13/10; F05B 2230/21; F05B 2230/23; F05B 2240/302; G05B 19/4155; G05B 2219/2619; G05B 2219/45147
See application file for complete search history.

(56) References Cited

U.S. PATENT DOCUMENTS

| 7,922,454 B1 | 4/2011 | Riddell |
| 2003/0116262 A1 | 6/2003 | Stiesdal et al. |
| 2009/0155084 A1 | 6/2009 | Livingston et al. |
| 2010/0143148 A1 | 6/2010 | Chen et al. |
| 2012/0082547 A1 | 4/2012 | Baker et al. |

(Continued)

FOREIGN PATENT DOCUMENTS

| CN | 101457781 A | 6/2009 |
| CN | 102454539 A | 5/2012 |

(Continued)

OTHER PUBLICATIONS

European Search Report dated Jan. 17, 2019 for Application No. 18176812.8.

*Primary Examiner* — Juan G Flores
*Assistant Examiner* — Joshua R Beebe
(74) *Attorney, Agent, or Firm* — Schmeiser, Olsen & Watts LLP

(57) ABSTRACT

Provided is a method of manufacturing wind turbine rotor blades, wherein each rotor blade includes an inboard section and an outboard section, and wherein an inboard blade section including a root end and a transition region is manufactured using a first casting process; and an outboard blade section including an airfoil region is manufactured using a second casting process, which second casting process is different from the first casting process. The invention further describes a wind turbine rotor blade manufactured using such a method.

7 Claims, 3 Drawing Sheets

(56) References Cited

U.S. PATENT DOCUMENTS

| | | |
|---|---|---|
| 2012/0211637 A1 | 8/2012 | Christiansen et al. |
| 2012/0213642 A1* | 8/2012 | Wang .................... F03D 1/0675 416/232 |
| 2016/0108736 A1* | 4/2016 | Schuring ............... F03D 1/0675 416/226 |
| 2017/0122287 A1 | 5/2017 | Dobbe et al. |
| 2018/0223796 A1* | 8/2018 | Yarbrough ............ F03D 1/0675 |

FOREIGN PATENT DOCUMENTS

| | | | |
|---|---|---|---|
| EP | 1184566 A1 * | 3/2002 | ............. F03D 80/30 |
| EP | 1310351 A1 | 5/2003 | |
| EP | 2316629 A1 | 5/2011 | |
| EP | 2316629 B1 * | 5/2012 | ......... B29C 33/3842 |
| WO | 2010065928 A1 | 6/2010 | |
| WO | WO 2010065928 A1 | 6/2010 | |
| WO | 2014202689 A1 | 12/2014 | |
| WO | WO 2014202689 A1 | 12/2014 | |
| WO | 2015189338 A1 | 12/2015 | |
| WO | WO 2015189338 A1 | 12/2015 | |
| WO | 2018/091735 A1 | 5/2018 | |

\* cited by examiner

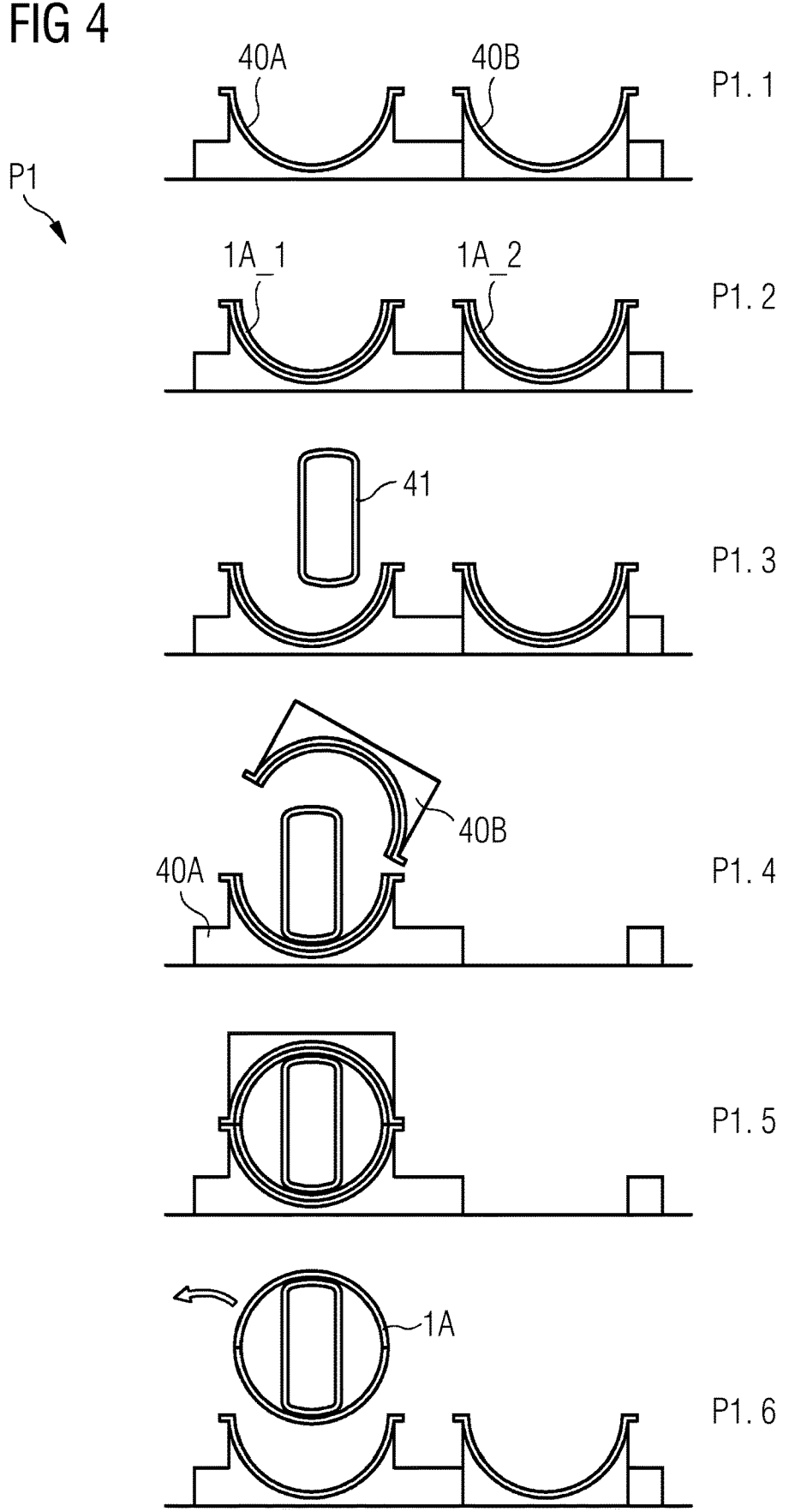

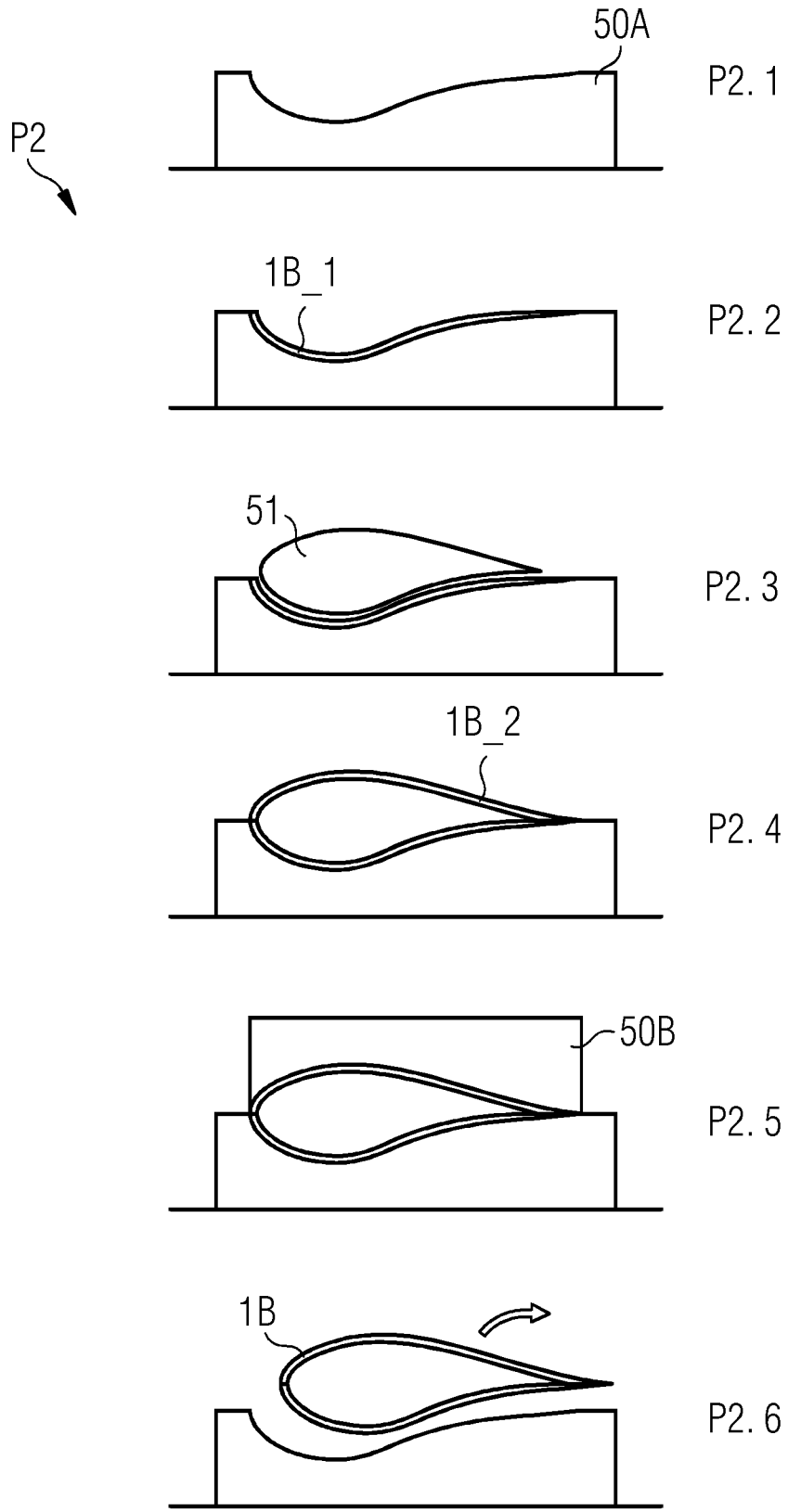

METHOD OF MANUFACTURING WIND TURBINE ROTOR BLADES

CROSS-REFERENCE TO RELATED APPLICATIONS

This application claims priority to European Application No. 18176812.8, having a filing date of Jun. 8, 2018, the entire contents of which are hereby incorporated by reference.

FIELD OF TECHNOLOGY

The following describes a method of manufacturing wind turbine rotor blades. The following further describes a wind turbine rotor blade.

BACKGROUND

Wind turbine rotor blades are usually made by infusion moulding of composite materials. There are various different kinds of mould that may be used to manufacture a blade, and each type has advantages and disadvantages.

In an open-mould technique, the mould comprises two halves, whereby each mould half extends from root to tip. A composite material layup is completed for each blade half, and the mould is then vacuum-bagged before carrying out resin infusion and curing steps. The cured blade halves are then glued together along their outer edges.

In a closed-mould casting technique, the composite material layup is completed for the entire blade, using a mandrel or other element to assist in shaping the blade, and the mould is then closed before carrying out the resin infusion and curing steps.

Moulding large one-piece wind turbine blades is time-consuming and requires correspondingly large floor space for the moulds. A significant quantity of time is required to prepare the thicker regions in the inboard part of the blade, since the chord length is greatest here (the "inboard" part includes the blade root end as well as a transition section to the airfoil). Generally, multiple layers of fibreglass mats need to be built up in the inboard blade region in order to achieve the desired mass. For example, a desired mass may be around 700 kg per meter in the widest part of the inboard region of a 75 m rotor blade. Much of the time allotted for preparation of the layup is therefore spent in the inboard region.

The time taken to prepare the blades for moulding is therefore a considerable cost factor. Various ways of reducing the preparation time are known, for example it is known to manufacture the beam (the main load carrying element which is placed inside the blade) in advance and to place the pre-fabricated part into the mould. Such time-saving techniques can be used in both open-mould and closed-mould processes.

Floor-space is also a cost factor. However, the size of the moulds used to manufacture long one-piece rotor blades (in the region of 70 m or more) mean that floor space costs are generally high.

SUMMARY

An aspect relates to an improved method of rotor blade manufacture that overcomes the problems outlines above.

The inventive method is for manufacturing wind turbine rotor blades that each comprise an inboard section and a separately manufactured outboard section. An inboard blade section comprises a root end and a transition region and is manufactured using a first casting process. An outboard blade section comprises an airfoil region and is manufactured using a second casting process. The second casting process is different from the first casting process, whereby this is to be understood to mean that the two casting processes require different moulding tools and different moulding techniques. Thus, the combination provides more freedom for blade manufacture, since the inventive method can make best use of the advantages of both of these casting processes.

The embodiments are based on the insight that significant time can be saved if the blade is divided into sections according to the time required to manufacture the different sections, and if different casting techniques are used to manufacture the time-intensive sections and the less time-intensive sections. By manufacturing a time-intensive section separately from a less time-intensive section, it is possible to optimize the process flow. For example, it is known that more time is needed for material handling on the inboard part of the blade to achieve the required thickness. Manufacture of an inboard blade section or blade root section is therefore time-intensive, whereas the manufacture of an outboard blade section is significantly less time-intensive. In the known art, regardless of the moulding technique used to cast a complete one-piece rotor blade, layup of the outboard blade section is generally completed well before layup of the inboard blade section is finished, but infusion-moulding and curing steps must wait unit the root and transition layup is complete. Therefore, in the known art methods, floor space and resources are effectively wasted because of the length of time needed to complete the layup of the root and transition regions.

While it has been proposed to manufacture rotor blades in two or more parts as "split blades", this has only been to facilitate the transport and installation of a wind turbine, for example by choosing one type of root section, selecting one of several possible airfoil or tip sections, transporting the sections to the installation site and mounting the tip sections to the root sections. However, such methods do not focus on using different types of casting process to manufacture the root and tip sections, so that this known art two-part blade does not make any contribution to improving manufacturing efficiency or reducing manufacturing costs.

According to embodiments of the invention, the wind turbine rotor blade will comprise an outboard blade section that was manufactured using a first casting process, and an inboard blade section that was manufactured using a second, different casting process.

Particularly advantageous embodiments and features of embodiments of the invention are given by the dependent claims, as revealed in the following description. Features of different claim categories may be combined as appropriate to give further embodiments not described herein.

In the following, without restricting embodiments of the invention in any way, it may be assumed that each rotor blade has a length in the region of 70 m or more. An "inboard" blade section shall be understood to include the blade root end as well as a transition section in which the blade root end with its circular cross-section transitions to the airfoil shape of the remainder of the rotor blade. The inboard blade section includes the blade root end and extends to at least 30% of the overall blade length. The inboard blade section includes the greater part of the airfoil portion of the rotor blade.

The method according to embodiments of the invention is particularly well suited for the manufacture of large rotor blades, since these are very massive in the thickest regions. A rotor blade manufactured using the inventive method has a length of at least of 70 m. The (usually) circular root end section transitions smoothly into an airfoil shape in the transition region, and this transition is generally quite short. The transition region is the region with maximum chord length. The rotor blade walls must therefore be relatively thick in this region in order to withstand loads during operation. In preferred embodiments of the invention, the inboard blade section of the rotor blade has a mass in the region of 700 kg/m in the transition region. In contrast, the outboard blade section with its gradually narrowing airfoil shape is lighter. In preferred embodiments of the invention, the outboard blade section has a mass in the region of 50 kg/m.

In preferred embodiments of the invention, the first casting process is an open-mould casting process in which two inboard section halves are separately cast using two inboard mould halves. After infusion moulding and curing, the inboard halves are then glued together. The advantage of preparing the inboard or root section in this way—independently of and separately from the outboard airfoil section—is that none of the layup time is wasted. In other words, there is no finished airfoil layup waiting while time is being spent in achieving the desired thickness at the root and transition portions of the blade.

When the inboard section is manufactured using the open-mould casting technique, the outboard or airfoil section is moulded using a closed-mould casting process in which the entire layup is done in a first outboard mould half. Once the layup is complete, a second outboard mould half is placed over the layup to close the mould. Infusion moulding steps are performed to complete the casting process. The entire outboard section or airfoil is therefore made using the closed-mould casting process. An advantage of preparing the outboard sections in this way is that this casting technique makes it possible to achieve the high surface quality required for the airfoil part of a rotor blade. Because the composite material is also relatively thin towards the tip end of the blade, completion of the layup is also relatively fast.

The inventive method can significantly reduce the manufacturing costs for an individual blade by smart scheduling of the casting stages. In preferred embodiments of the invention, the method comprises the steps of scheduling two consecutive workflow stages; manufacturing three outboard sections and one inboard section during one workflow stage; and manufacturing two inboard sections during the other workflow stage.

Three inboard sections can then be connected to the three outboard sections to complete three rotor blades. For the completion of these three rotor blades, only two moulds are required to prepare the three inboard sections.

As indicated above, manufacture of an inboard section is generally significantly more time-consuming than the manufacture of an outboard section. Therefore, in preferred embodiments of the invention, the duration of a workflow stage is determined on the basis of the time required to manufacture an inboard blade section. The duration of a workflow stage can be determined by measuring the time it takes to prepare an inboard blade section using the first casting process, e.g. an open-mould casting process. Any associated costs may also be determined, for example personnel costs, floor space costs, etc. On the basis of the established costs and timings, a rotor blade manufacturer can determine the most cost-efficient way of manufacturing a certain number of rotor blades. For example, if rotor blades are to be manufactured for a wind park with 100 wind turbines, using the inventive method, the manufacturer can first determine the optimum number of inboard blade sections that can be manufactured in a single workflow stage and the optimum number of outboard blade sections that can be manufactured in a single workflow stage, and can provide the appropriate number of moulds. Scheduling of the workflow stages to manufacture the separate inboard and outboard sections can then be done in the framework of an optimised process flow.

The inboard and outboard sections can be joined at some appropriate stage. In preferred embodiments of the invention, the blade sections are joined after completion of both casting processes. For example, three completed inboard sections may be joined to three completed outboard sections at some stage after they have been manufactured. Alternatively, the blade sections are joined during one of the two casting processes.

To this end, a suitable connector interface is provided. This can be achieved by preparing each inboard and outboard section to include a connector interface portion. A connector interface portion can be a dedicated component that is attached in some way to the inboard/outboard section during casting. Alternatively, in preferred embodiments of the invention, a connector interface portion is formed as part of the beam or load-carrying element that is embedded in the blade section during casting. For example, when casting the inboard section, the beam can extend beyond the non-root end of the inboard section by a certain amount. When casting the outboard section, a correspondingly "negative shape" can be prepared so that the inboard and outboard sections can simply be fitted together. This kind of connector interface can be used to connect an already completed outboard section to an inboard section during casting of the inboard section. Equally, this kind of connector interface can be used to connect an already completed outboard section to an already completed inboard section.

BRIEF DESCRIPTION

Some of the embodiments will be described in detail, with references to the following Figures, wherein like designations denote like members, wherein:

FIG. 4 shows steps of a first casting process; and

FIG. 5 shows steps of a second casting process.

DETAILED DESCRIPTION

Figure 1:
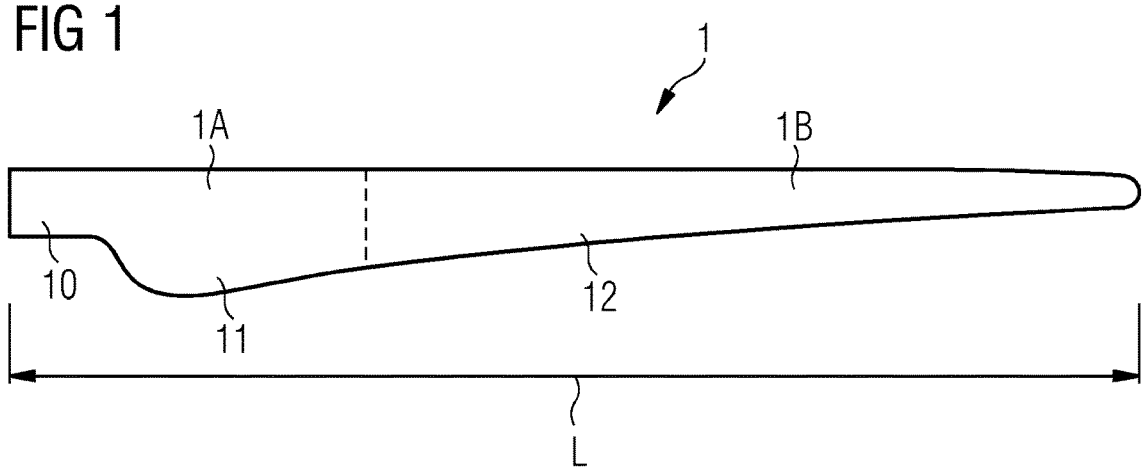
FIG. 1 shows an embodiment of a wind turbine rotor blade manufactured using the inventive method.
Figure 2:
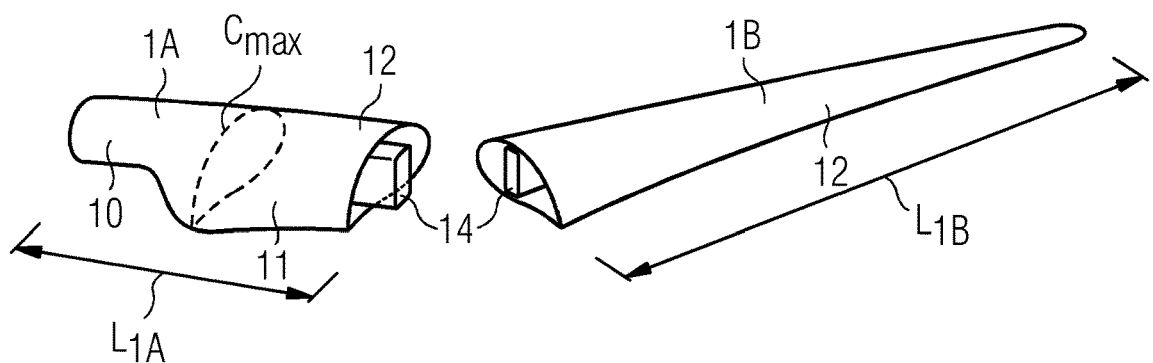
FIG. 2 shows the two sections of the blade of FIG. 1.

FIG. 1 shows an embodiment of a wind turbine rotor blade 1 manufactured using the inventive method. Both sections 1A, 1B are manufactured using different casting processes and joined together to make a seamless connection. FIG. 2 shows the blade sections 1A, 1B as they might appear if each blade section 1A, 1B is manufactured separately.

The rotor blade 1 comprises a root end 10, a transition region 11, and an airfoil 12. The transition region 11 is shaped to make a smooth transition between the (usually) circular root end 10 and the airfoil. The blade 1 is assembled from two sections 1A, 1B as indicated by the dotted line in FIG. 1, for example by means of an interface 14 indicated in FIG. 2. The inboard blade section 1A comprises the root end 10, the transition region 11 and part of the airfoil 12. The outboard blade section 1B comprises the remainder of the airfoil 12.

The blade 1 can have a length L of 70 m or more. The blade 1 is thickest in the transition region, firstly because this region is the widest part of the blade, and secondly because this part of the blade is subject to the highest loads during operation. The thickest part of the blade 1 generally also coincides with the longest chord as indicated by the largest airfoil shape $C_{max}$ in FIG. 2. The length $L_{1A}$ of the inboard section 1A may comprise at least 1% of the total blade length L, and comprises at least 10%, more at least 15% and most at least 20% of the total blade length L. The length $L_{1A}$ of the inboard section 1A may comprise up to 90% of the total blade length L, more up to 50%-80% of the total blade length L, and most up to 40% of the total blade length L. The length $L_{1B}$ of the outboard section 1B makes up the remainder of the total blade length L. Accordingly, a preferred length $L_{1A}$ of the inboard section 1A, expressed as a percentage of the total blade length L, lies within the range of 10%-90%, more in the range of 15%-80%, more in the range of 20%-60%, more in the range of 20%-50% and most in the range of 20%-40%.

Figure 3:
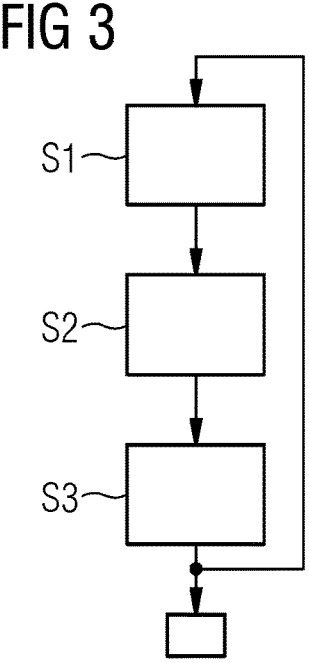
FIG. 3 illustrates stages of an embodiment of the inventive method.

FIG. 3 illustrates stages S1, S2, S3 of an embodiment of the inventive method. Here, two casting workflow stages S1, S2 have been scheduled, for example to manufacture rotor blades for wind turbines that each requires three rotor blades. In a first workflow stage S1, a multiple of three outboard sections is manufactured, along with the same multiple of inboard sections. For example, six outboard sections and two inboard sections are manufactured simultaneously in workflow stage S1. In a subsequent process step S2, the remaining inboard sections are manufactured. Using the above example, the remaining four inboard sections are manufactured. In a third workflow stage S3, the six inboard sections are joined to the six outboard sections. With the method carried out as described here, a total of only four inboard section moulds is required for the manufacture of six blades.

The third workflow stage S3 may be temporally independent of the first and second workflow stages S1, S2 if the blade sections 1A, 1B are manufactured separately. Alternatively, the third workflow stage S3 may be temporally related to the second workflow stage S2 if the previously manufactured outboard blade sections 1A are joined to the inboard sections before casting and curing the inboard sections 1B.

FIG. 4 is a schematic representation of the process steps involved in a first casting process P1. This technique may also be referred to as the "butterfly" technique and is particularly suited to the manufacture of an inboard blade section as indicated here. Mould halves 40A, 40B are prepared in step P1.1 and layup is performed to prepare two section halves 1A_1, 1A_2. In step P1.2 the section halves 1A_1, 1A_2 are cast and cured separately (usually simultaneously). In step P1.3 a load-bearing spar or beam 41 is arranged in the interior, and the mould halves 40A, 40B are joined in step P1.4 and the cured section halves 1A_1, 1A_2 are then glued together in step P1.5. Once the glue has cured, the finished component—in this case an inboard blade section 1A—can be removed from the mould 40A, 40B.

FIG. 5 is a schematic representation of the process steps involved in a second casting process P2. This technique may also be referred to as the "integral" technique and is particularly suited to the manufacture of an outboard blade section 1B as indicated here. A lower mould half 50A is prepared in step P2.1 and layup 1B_1 of the lower half is done in step P2.2. A mandrel 51 or similar element is arranged in place in step P2.3 to assist in shaping the upper half. Layup of the upper half 1B_2 is then completed in step P2.4. In a subsequent step P2.5, the upper mould half 50B is put into place, and the entire blade section 1B is cast and cured in step P2.6. Generally, the mandrel is removed at this point.

The outboard blade section 1B can then be connected to an inboard blade section 1A manufactured as explained in FIG. 5 above. Alternatively, the outboard blade section 1B can be connected to an inboard blade section 1A before the inboard blade section 1B is cured, for example at some point between step P1.4 and step P1.5 above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of manufacturing wind turbine rotor blades, wherein each rotor blade comprises an inboard section and an outboard section, the method comprising:
    manufacturing the inboard blade section comprising a root end and a transition region using a first casting process;
    manufacturing the outboard blade section comprising an airfoil region using a second casting process, wherein the second casting process is different from the first casting process;
    providing a connector interface for connecting the inboard blade section and the outboard blade section, the connector interface disposed at least partially inside at least one of the inboard blade section and the outboard blade section;
    scheduling two workflow stages that occur consecutively;
    manufacturing three outboard sections and one inboard section simultaneously during a first of the two workflow stages; and
    manufacturing two inboard sections simultaneously during a second of the two workflow stages.

2. The method according to claim 1, wherein the first casting process is an open-mould casting process.

3. The method according to claim 1, wherein the second casting process is a closed-mould process.

4. The method according to claim 1, further comprising joining the inboard blade section to the outboard blade section to complete the rotor blade.

5. The method according to claim 1 wherein a duration of each of the two workflow stages is determined on a basis of a time required to manufacture the inboard blade section.

6. The method according to claim 1, wherein the inboard blade section and the outboard blade section are joined during one of the two casting processes.

7. The method according to claim 1, further comprising joining the inboard blade section and the outboard blade section after completion of both casting processes.

* * * * *